United States Patent
Castle et al.

(10) Patent No.: US 11,708,831 B1
(45) Date of Patent: Jul. 25, 2023

(54) DEBRIS EXCLUSION SEAL GUARD FOR A PUMP

(71) Applicant: Parker-Hannifin Corporation, Cleveland, OH (US)

(72) Inventors: Thomas K. Castle, Morristown, TN (US); Somer R. Malone, Greeneville, TN (US); Brian Painter, Chuckey, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 17/867,927

(22) Filed: Jul. 19, 2022

Related U.S. Application Data (60) Provisional application No. 63/276,779, filed on Nov. 8, 2021, provisional application No. 63/247,330, filed on Sep. 23, 2021.

(51) Int. Cl.
| | |
|---|---|
| *F04B 1/122* | (2020.01) |
| *F04B 53/00* | (2006.01) |
| *F04B 9/02* | (2006.01) |
| *F04B 53/16* | (2006.01) |
| *F16J 15/34* | (2006.01) |
| *F04D 29/12* | (2006.01) |
| *F04D 29/40* | (2006.01) |
| *F04D 13/02* | (2006.01) |
| *F04D 29/60* | (2006.01) |

(52) U.S. Cl.
CPC .............. *F04B 53/16* (2013.01); *F04B 1/122* (2013.01); *F04D 13/02* (2013.01); *F04D 29/126* (2013.01); *F04D 29/406* (2013.01); *F04D 29/605* (2013.01); *F16J 15/3464* (2013.01); *F04B 9/02* (2013.01); *F04B 53/006* (2013.01)

(58) Field of Classification Search
CPC .......... F04B 1/0448; F04B 1/122; F04B 9/02; F04B 53/16; F04B 53/006; F04D 13/02; F04D 29/12; F04D 29/126; F04D 29/406; F04D 29/605; F05B 2240/57; F16H 39/10
See application file for complete search history.

(56) References Cited

U.S. PATENT DOCUMENTS

| | | | | |
|---|---|---|---|---|
| 3,599,990 | A | * | 8/1971 | Greiner .................. B63H 23/36 277/370 |
| 6,454,268 | B1 | | 9/2002 | Muraki |
| 7,914,431 | B2 | | 3/2011 | Trevillyan et al. |
| 8,191,899 | B2 | | 6/2012 | Droscher et al. |
| 8,511,689 | B2 | | 8/2013 | Takahashi |
| 8,635,867 | B2 | * | 1/2014 | Dong ...................... F16H 39/42 60/485 |
| 9,151,374 | B2 | * | 10/2015 | Richardson ............... F03C 1/26 |
| 10,426,084 | B2 | | 10/2019 | Ito et al. |
| 2021/0156417 | A1 | * | 5/2021 | Escobar ................. F16J 15/447 |

FOREIGN PATENT DOCUMENTS

GB 2058960 A * 4/1981 ............. F16J 15/002

* cited by examiner

*Primary Examiner* — Christopher R Legendre
(74) *Attorney, Agent, or Firm* — McDonnell Boehnen Hulbert & Berghoff LLP (57) ABSTRACT

An example hydraulic pump comprises: a housing; an input shaft extending from the housing; a seal disposed within the housing and positioned about the input shaft; and a seal guard member positioned about the input shaft and mounted to the housing at an interface between the input shaft and the housing, wherein the seal guard member is configured to allow rotation of the input shaft without rotating therewith.

17 Claims, 8 Drawing Sheets

DEBRIS EXCLUSION SEAL GUARD FOR A PUMP

CROSS REFERENCE TO RELATED APPLICATION

The present application claims priority to U.S. Provisional Application No. 63/247,330 filed on Sep. 23, 2021 and U.S. Provisional Application No. 63/276,779 filed on Nov. 8, 2021, the entire contents of all of which are herein incorporated by reference as if fully set forth in this description.

TECHNICAL FIELD

This disclosure relates to a seal guard that protects a seal on a rotating input shaft of a pump used for a transmission such as a mower transmission.

BACKGROUND

Mowers, such as a zero turn mower, use an internal combustion engine or electric motor to drive a pair of hydrostatic transmissions that each use a hydraulic pump and hydraulic motor to propel the mower. The input shaft of each transmission is used to drive the respective hydraulic pump, and the input shaft can be driven by the engine or electric motor via gears, belt, or chain.

The input shaft typically extends from the transmission housing, and a shaft seal is used at the interface between the shaft and housing to seal in the fluid (e.g., the transmission oil) of the transmission housing. In operation, the mower may encounter debris such as weeds, string, tape, etc. that are caught up and can become wrapped around the input shaft. As this debris is wrapped around the input shaft, it may damage the pump shaft seal, thereby causing fluid leakage to an external environment of the transmission.

It may thus be desirable to protect the shaft seal from such damage. It is with respect to these and other considerations that the disclosure made herein is presented.

SUMMARY

The present disclosure describes implementations that relate to a debris exclusion seal guard for a pump.

In a first example implementation, the present disclosure describes a hydraulic pump. The hydraulic pump includes a housing; an input shaft extending from the housing; a seal disposed within the housing and positioned about the input shaft; and a seal guard member positioned about the input shaft and mounted to the housing at an interface between the input shaft and the housing, wherein the seal guard member is configured to allow rotation of the input shaft without rotating therewith.

In a second example implementation, the present disclosure describes a hydrostatic transmission of a vehicle. The hydrostatic transmission includes: a hydraulic motor configured to drive a wheel of the vehicle; and the hydraulic pump of the first example implementation configured to provide fluid flow to drive the hydraulic motor.

In a third example implementation, the present disclosure describes a vehicle comprising the hydrostatic transmission of the second example implementation.

In a fourth example implementation, the present disclosure describes a method of assembling the hydraulic pump of the first example implementation. The method includes: (i) inserting an input shaft within a housing of a hydraulic pump, such that the input shaft extends from the housing; (ii) positioning a seal within the housing about the input shaft; (iii) placing a retaining ring in an annular groove formed in an interior surface of the housing to secure the seal in position onto the input shaft; and (iv) mounting a seal guard member to the housing about the input shaft at an interface between the input shaft and the housing, wherein the seal guard member is configured to allow rotation of the input shaft without rotating therewith.

The foregoing summary is illustrative only and is not intended to be in any way limiting. In addition to the illustrative aspects, implementations, and features described above, further aspects, implementations, and features will become apparent by reference to the figures and the following detailed description.

DETAILED DESCRIPTION

An example vehicle, such a mower, has a pair of hydrostatic transmissions that propel the mower. The hydrostatic transmission includes a hydraulic pump and a hydraulic motor. The hydraulic pump draws fluid from a fluid reservoir and displaces the fluid to the hydraulic motor, which drives a wheel of the vehicle.

The transmission can include an input shaft driven by an engine or electric motor of the vehicle. For instance, a pulley can be mounted to the input shaft, and a transmission belt or chain can couple the engine/motor of the vehicle to the pulley to drive the input shaft.

The input shaft typically extends from the transmission housing, and a shaft seal is used at the interface between the input shaft and a housing of the transmission to preclude fluid leakage to an external environment of the housing. During operation of the vehicle, debris may cause damage to the seal. In the example where the vehicle is a mower, during operation, the mower may encounter debris such as weeds, wigs, string, tape, etc. that are caught up and can become wrapped around the input shaft in the area between the pulley and the shaft seal. As this debris is wrapped around the input shaft, it may damage to the shaft seal leading to fluid leakage, which may render the transmission inoperable.

Disclosed herein are assemblies, systems, vehicles, and methods associated with a seal guard that protects the seal from such debris. In an example, the seal guard can be disposed in a gap between the seal and the pulley that drives the input shaft. The seal guard can surround the seal to exclude debris from interacting with and damaging the seal. In an example, the seal guard can be mounted to the housing of the pump. Further, the seal guard can have an anti-rotation feature that prevents the seal guard from rotating with the input shaft.

Figure 1:
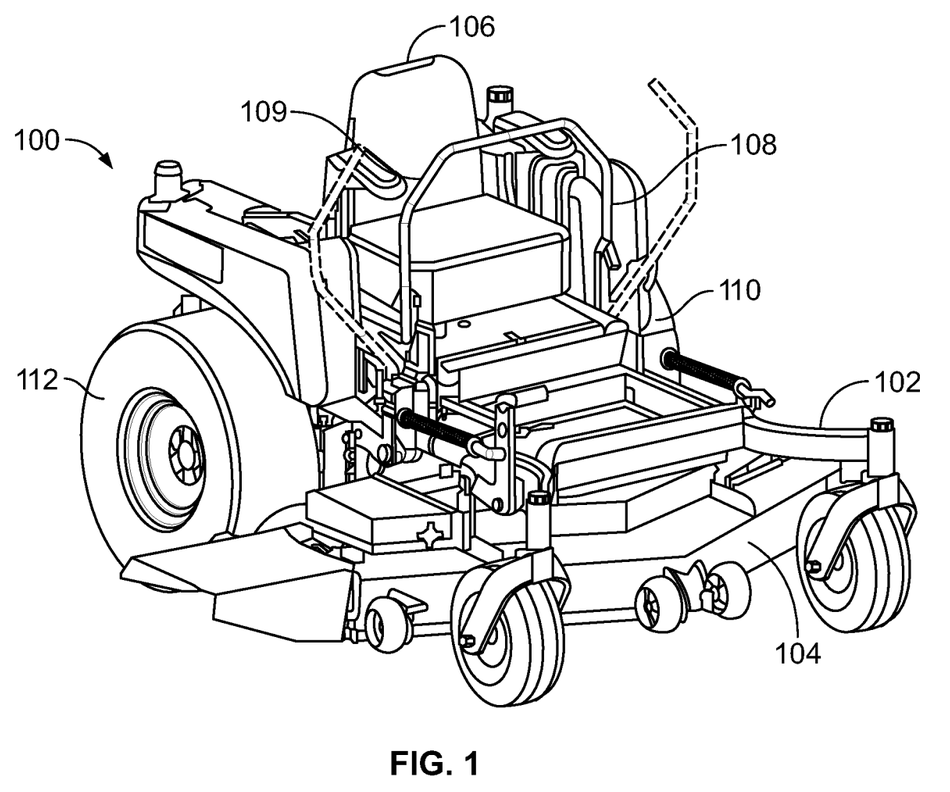
FIG. 1 illustrates a perspective view of a mower, in accordance with an example implementation.

FIG. 1 illustrates a perspective view of a mower 100, in accordance with an example implementation. The mower 100 can be, for example, zero-turn-radius mower (e.g., a lawn mower with a turning radius that is effectively zero).

The mower 100 includes a frame 102. The mower 100 also includes a mower deck 104 supported by the frame 102 for mowing grass, for example. The mower 100 further includes an operator seat 106 and steering control levers 108, 109 for operating the mower 100.

In examples, a rear mounted engine (not shown) can be mounted to the frame 102 behind the operator seat 106. The engine can, for example, be an internal combustion engine configured to provide power to a drive system coupled to respective rear wheels such as left wheel 110 and right wheel 112 that drive the mower 100.

Each wheel of the wheels 110, 112 can be independently controlled via a respective hydrostatic transmission, and the steering control levers 108, 109 can be configured to control speed and direction of the wheels 110, 112 via actuating the respective hydrostatic transmissions. Thus, the drive system can be controlled by an operator to independently drive the wheels 110, 112 to propel the mower 100. The configuration of the mower 100 is an example configuration and it should be understood that other mower configurations and vehicle types can be used.

Figure 2:
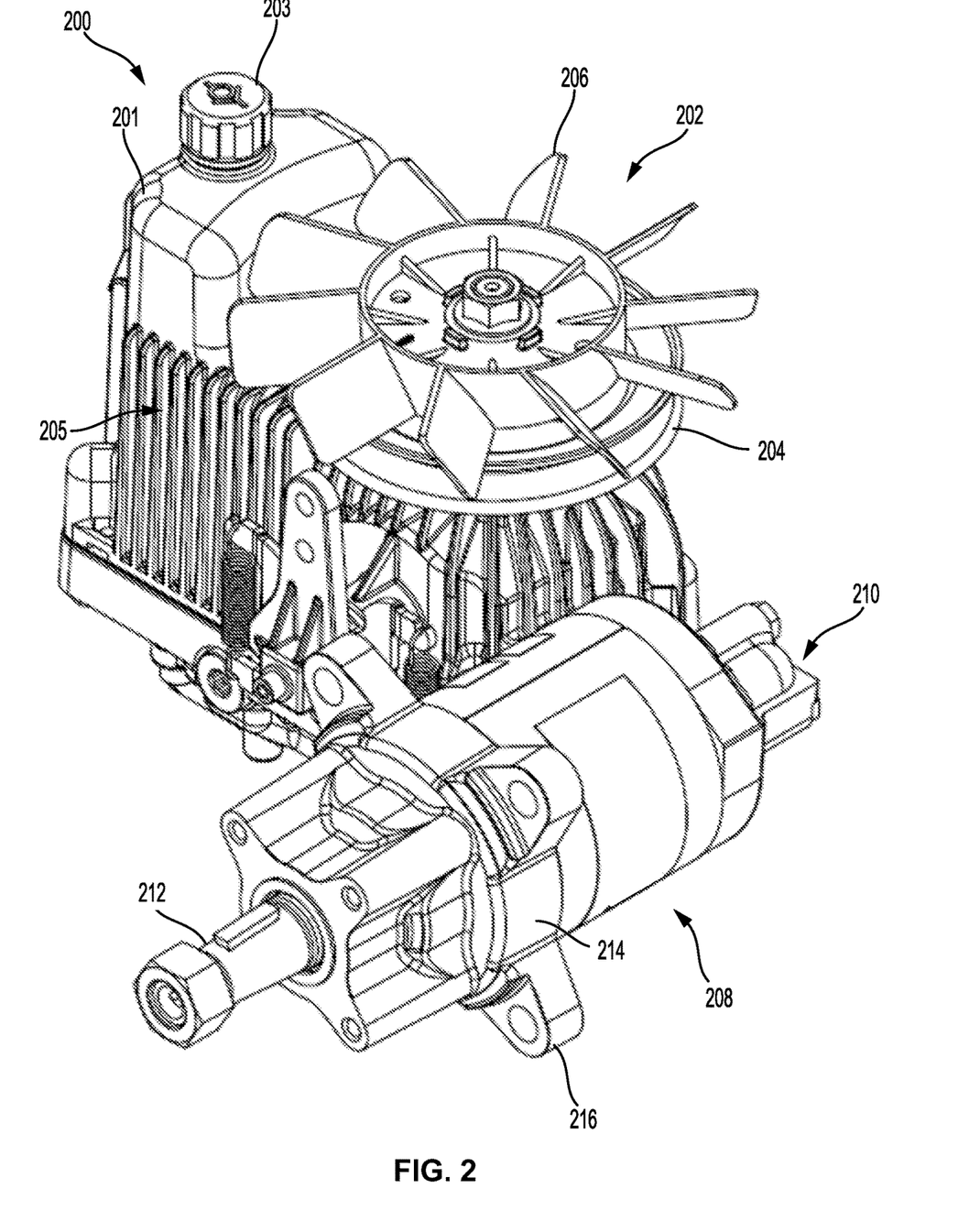
FIG. 2 illustrates a perspective view of a hydrostatic transmission, in accordance with an example implementation.

FIG. 2 illustrates a perspective view of a hydrostatic transmission 200, in accordance with an example implementation. The hydrostatic transmission 200 includes a reservoir 201 configured to contain hydraulic fluid at a low pressure, e.g., 0-70 pounds per square inch (psi). A cap 203 covers and seals the fluid filling opening of the reservoir 201.

The hydrostatic transmission 200 includes a hydraulic pump 202 for generating pressurized fluid. The hydraulic pump 202 has a housing 205 configured to contain or house the components of the hydraulic pump 202. The reservoir 201 is integrated with, coupled to, or formed as a portion of the housing 205.

The hydrostatic transmission 200 includes an input shaft (e.g., input shaft 308 described below and shown in FIG. 3) that runs through the hydraulic pump 202 and coupled to a rotating group within the hydraulic pump 202 as described below. The input shaft is coupled to a pulley 204, and a belt or chain can rotatably couple the pulley 204 to a prime over (e.g., an engine of the mower 100). As such, the prime mover causes the pulley 204 and the input shaft coupled thereto to rotate.

A fan 206 is also mounted to the input shaft. As the pulley 204 and the input shaft rotate, the fan 206 also rotates, thereby providing cooling air that facilitates reducing the temperature of the housing 205 as air from the fan 206 blows about the housing 205. The housing 205 can be configured to have fins (see, for example, fin 600 and fin 602 shown in FIG. 6) to facilitate heat transfer therefrom.

The hydrostatic transmission 200 further includes a hydraulic motor 208 that is rotatable by the fluid provided by the hydraulic pump 202. An interface block 210 is disposed between the hydraulic pump 202 and the hydraulic motor 208. The interface block 210 is configured to provide flow paths from the hydraulic pump 202 to the hydraulic motor 208 and back from the hydraulic motor 208 to the hydraulic pump 202, and then to the reservoir 201.

The hydraulic motor 208 includes a rotating group of components that rotates as fluid is provided from the hydraulic pump 202 and flows through the hydraulic motor 208. For example, the hydraulic motor 208 can have pistons disposed in a piston block and interface with a tilted swash plate. Due to the swash plate being tilted, as pressurized fluid is provided to the hydraulic motor 208 through the interface block 210, the pistons reciprocate and rotate with the piston block. An output shaft 212 can be rotatably-coupled to the piston block such that as the piston block rotates, the output shaft 212 rotates as well. The output shaft 212 is coupled to the wheel 110 or the wheel 112 of the mower 100. With this configuration, as the output shaft 212 rotates, the wheel rotates, thereby propelling the mower 100.

The hydrostatic transmission 200 can be mounted to a frame of the mower 100. Particularly, the hydraulic motor 208 includes a motor housing 214, and the motor housing 214 has a mounting flange 216 that is configured to be coupled to the frame of the mower 100 to mount the hydrostatic transmission 200 thereto. The mounting flange 216 has a mounting pattern with several holes to allow fasteners to couple the hydrostatic transmission 200 to the vehicle.

The mounting flange 216 can be integrated with the motor housing 214 of the hydraulic motor 208. In other words, the motor housing 214 and the mounting flange 216 can be a single component, e.g., can be cast as a single component, and therefore this configuration can eliminates the need for a separate bracket that couples the hydraulic motor 208 to the frame of the vehicle.

Figure 3:
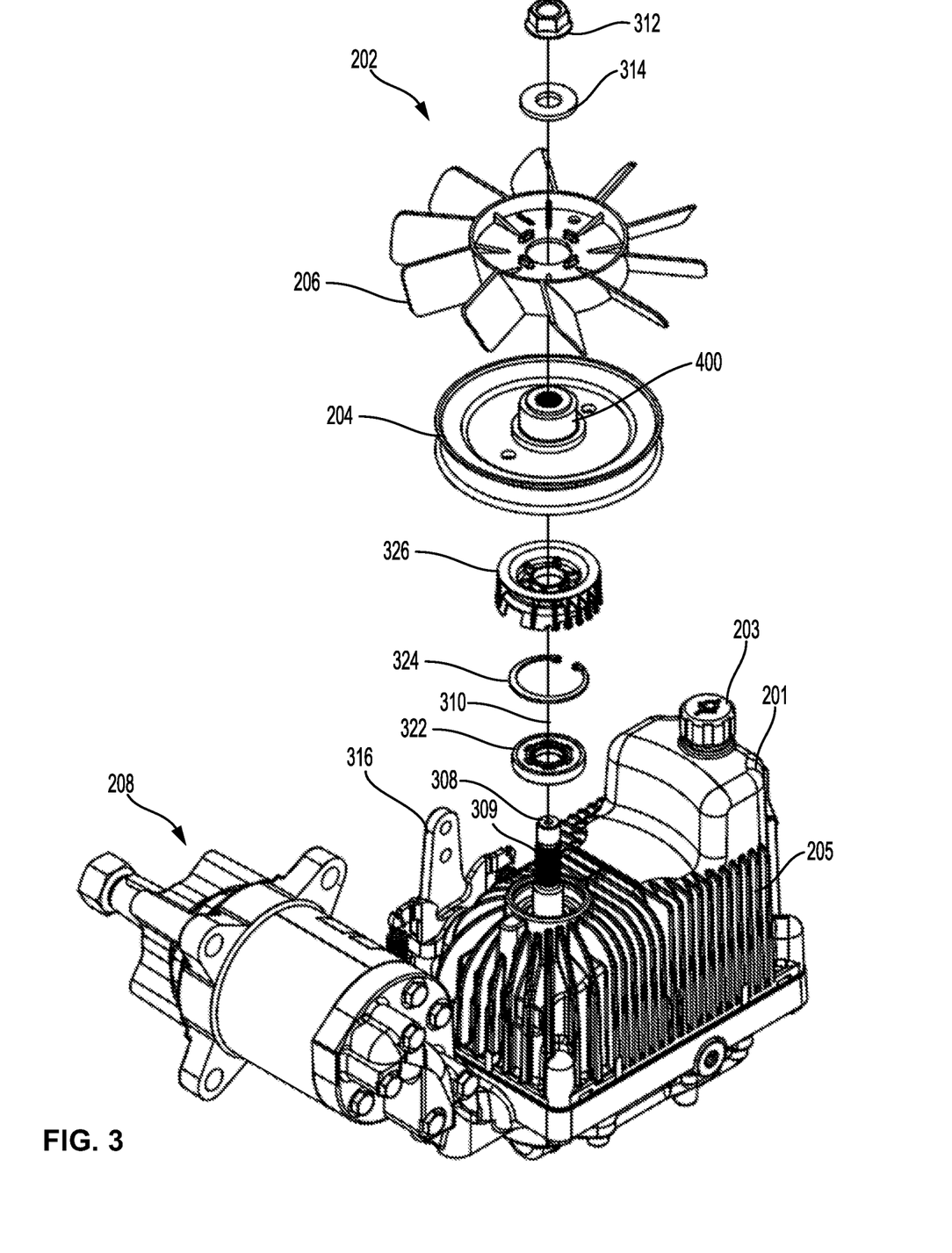
FIG. 3 illustrates an exploded view of a hydraulic pump of the hydrostatic transmission of FIG. 2, in accordance with an example implementation.

FIG. 3 illustrates an exploded view of the hydraulic pump 202, in accordance with an example implementation. The hydraulic pump 202 can include a swash block that is mounted in a cradle of the housing 205 of the hydraulic pump 202. The swash block is configured to receive a swash plate thrust bearing therein.

The hydraulic pump 202 also includes a pump barrel (e.g., a piston block) that houses a plurality of pistons. The hydraulic pump 202 further includes an input shaft 308 that is coupled to, and rotatable by, the pulley 204. Particularly, the pulley 204 has a pulley hub 400 that can have spline grooves formed on an interior surface thereof. The input shaft 308 in turn can have splines 309 formed on an exterior surface of the input shaft 308 and configured to engage with splines grooves formed in the pulley hub 400. This way, the pulley hub 400 can be rotatably-coupled to the input shaft 308.

The input shaft 308 can be mounted to the housing 205 via a bearing (see bearing 311 in FIG. 4A) that facilitates rotation of the input shaft 308 relative to the housing 205. Further, the fan 206 can be retained to the input shaft 308 and the pulley hub 400 via a nut 312 and washer 314.

The input shaft 308 is further coupled to the pump barrel. With this configuration, as the input shaft 308 rotates about its longitudinal axis 310, the pump barrel and the pistons are configured to also rotate about the longitudinal axis 310 of the input shaft 308, while the pistons remain engaged with the swash plate thrust bearing.

The hydraulic pump 202 includes a trunnion arm (not shown) extending out of the housing 205 of the hydraulic pump 202. An input lever 316 is coupled to an end of the trunnion arm.

In operation, the trunnion arm is used to control an angle of the swash block and the swash block thrust bearing relative to the longitudinal axis 310 of the input shaft 308. Particularly, as the input lever 316 is rotated a given angle, the trunnion arm rotates, causing the swash block and the swash plate thrust bearing to rotate to a particular angle. The angle of the swash plate thrust bearing relative to the longitudinal axis 310 of the input shaft 308 defines an extent of linear travel (i.e., the stroke) of the pistons, and thus controls the flow rate of fluid discharged by the hydraulic pump 202. Different rotation angles result in different fluid flow rates.

The hydraulic pump 202 further includes a seal 322 that is positioned about, or mounted to, the input shaft 308 within the housing 205. The seal 322 is a mechanical seal configured to prevent fluid leakage to an external environment of the hydraulic pump 202, containing pressurized fluid within the housing 205, and excluding contaminants from entering the internal chamber of the housing 205.

The seal 322 can represent a seal assembly that includes one or more seals (e.g., a primary seal and a back-up seal, a seal and back-up plate, etc.). The seal 322 is stationary (e.g., the seal 322 is fixed to the housing 205 and does not rotate with the input shaft 308).

The hydraulic pump 202 further includes a retaining ring 324. The retaining ring 324 can be disposed in an annular groove formed on interior surface of the housing 205 (see FIG. 4A), and is configured to retain, hold, or secure the seal 322 onto the input shaft 308.

During operation of the mower 100, debris such as grass, weed, wigs, hair, tape, etc. can be wrapped around the input shaft 308. Interaction between the debris and the seal 322 can cause damage to the seal 322. As such, the hydraulic pump 202 includes a seal guard member 326 mounted or interposed between the pulley 204 and the housing 205 (e.g., external to the housing) at the interface between the input shaft 308 and the housing 205. The seal guard member 326 is configured to protect the seal 322 from the debris by excluding the debris from entering the housing 205 and interacting with the seal 322.

Figure 4A:
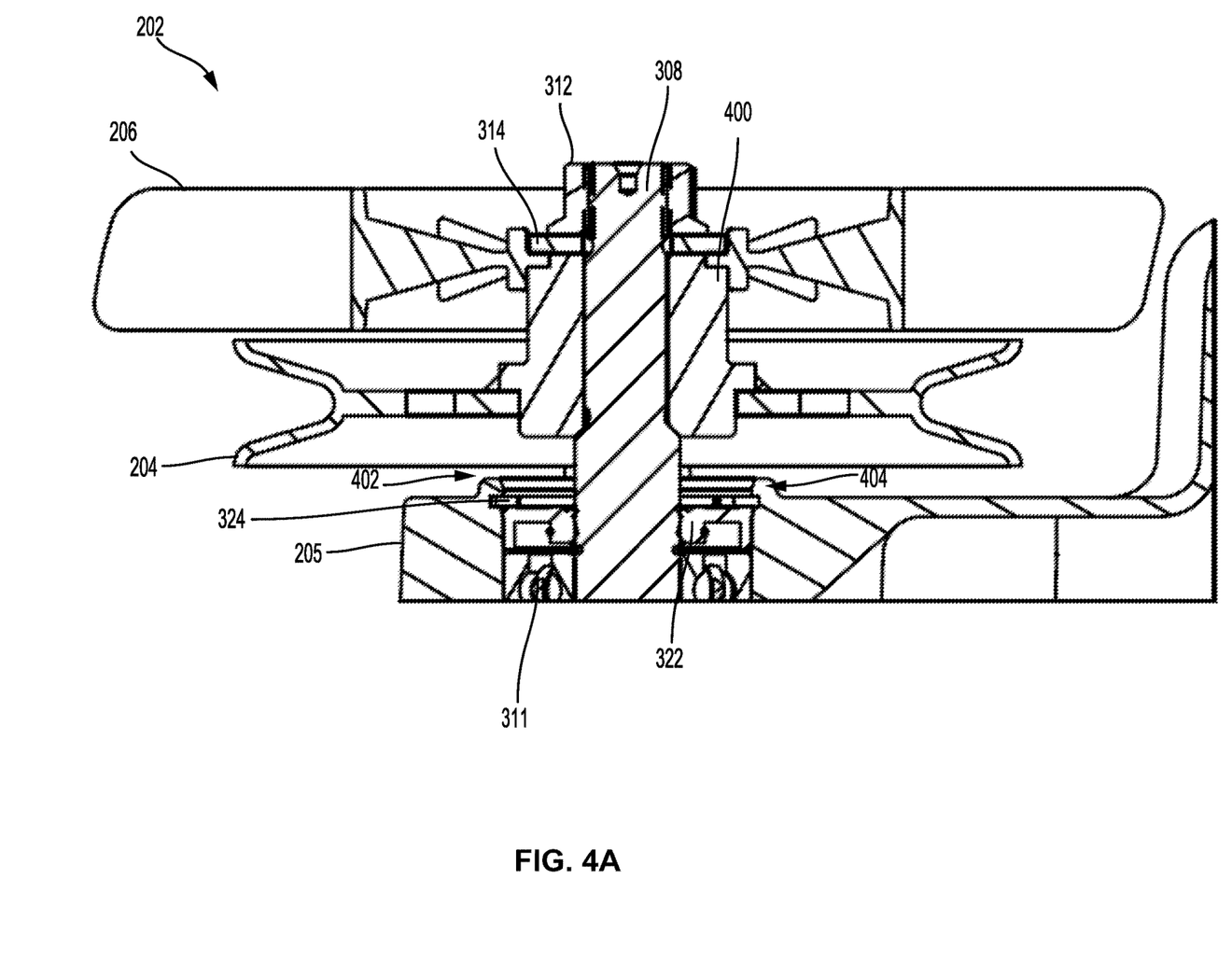
FIG. 4A illustrates a partial cross-sectional view of the hydraulic pump of FIG. 3 without a seal guard, in accordance with an example implementation.
Figure 4B:
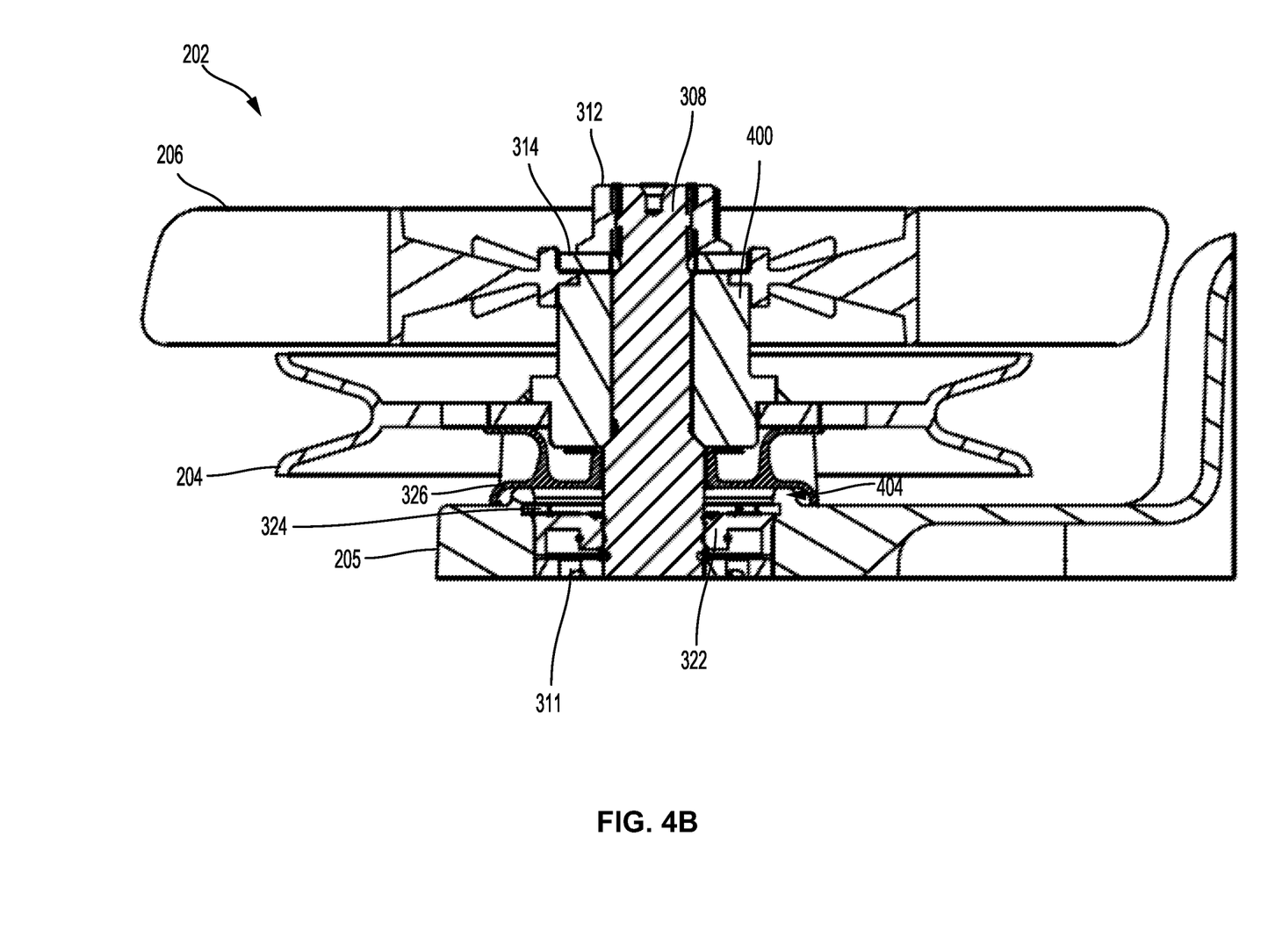
FIG. 4B illustrates a partial cross-sectional view of the hydraulic pump of FIG. 3 with a seal guard, in accordance with an example implementation.

FIG. 4A illustrates a partial cross-sectional view of the hydraulic pump 202 without the seal guard member 326, and FIG. 4B illustrates a partial cross-sectional view of the hydraulic pump 202 with the seal guard member 326, in accordance with an example implementation. As shown in FIG. 4A, the pulley 204 is part of a pulley assembly that includes a pulley hub 400. The pulley hub 400 is rotatably coupled to the input shaft 308, e.g., via a spline arrangement as mentioned above.

As depicted in FIG. 4A, without the seal guard member 326, a gap 402 exists between the pulley 204 and the housing 205. Overtime, debris can wrap around the inputs shaft 308 and accumulate in the gap 402. Such debris can enter the housing 205 and damage the seal 322, leading to fluid leakage.

Referring now to FIG. 4B, the seal guard member 326 is configured and shaped so as to fill the gap 402 and conform to the pulley 204, the pulley hub 400, the input shaft 308, and the housing 205. As shown in FIG. 4B, the housing 205 has a neck portion 404 to which the seal guard member 326 can be mounted. With the seal guard member 326 present, debris is excluded from entering the housing 205, and the seal 322 is protected.

Figure 5:
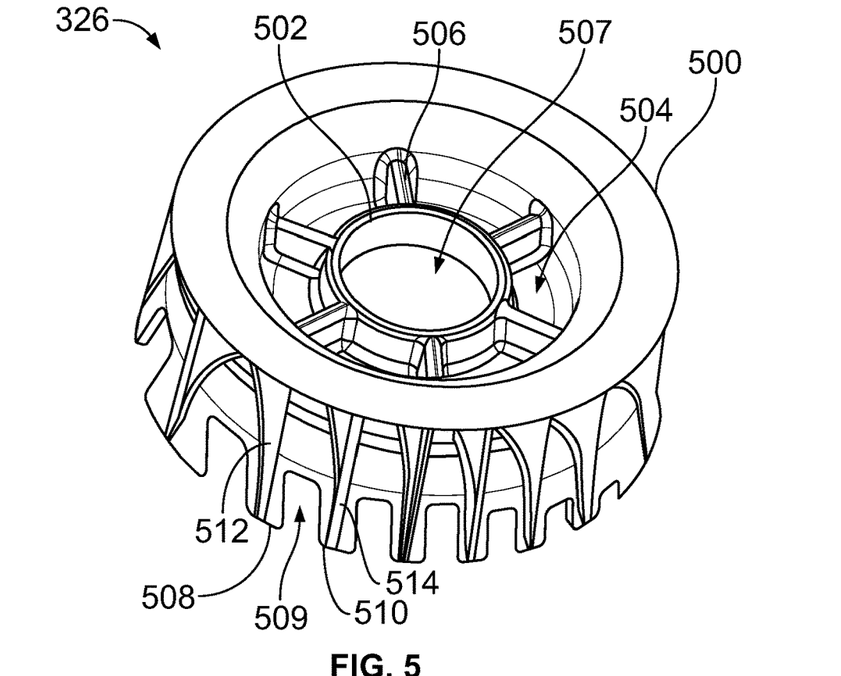
FIG. 5 illustrates a perspective view of the seal guard of FIG. 4B, in accordance with an example implementation.

FIG. 5 illustrates a perspective view of the seal guard member 326, in accordance with an example implementation. In the example implementation of FIG. 5, the seal guard member 326 is generally donut-shaped, and has a peripheral portion 500 and a central hub portion 502. The peripheral portion 500 is separated from the central hub portion 502 via a depression 504.

The seal guard member 326 can include stiffening ribs, such as stiffening rib 506, disposed between the peripheral portion 500 and the central hub portion 502. The stiffening ribs partition the depression 504 into respective compartments. Although six stiffening ribs are shown, more or fewer ribs can be used. The stiffening ribs may provide structural rigidity to the seal guard member 326.

The central hub portion 502 includes a central open space or hole 507 through which the input shaft 308 is disposed. Further, the depression 504 receives therein a portion of the pulley hub 400 shown in FIGS. 4A-4B.

The seal guard member 326 is configured to be fixedly-mounted to the housing 205. As such, the seal guard member 326 has an anti-rotation feature that precludes the seal guard member 326 from rotating with the pulley 204 and the input shaft 308. In other words, the seal guard member 326 is configured to allow rotation of the pulley 204 and the input shaft 308 without rotating therewith.

As an example anti-rotation feature, the seal guard member 326 can include a plurality of legs or tabs, such as tab 508 and tab 510, with spaces between each pair of tabs, such as space 509 between the tab 508 and the tab 510. These tabs can have different shapes and different widths, and the spaces therebetween can also have different sizes and configurations. The tabs can be disposed in a circular array about an edge or periphery of the seal guard member 326. The tabs are configured to interact with fins disposed about an exterior surface of the housing 205 so as to preclude rotation of the seal guard member 326.

Figure 6:
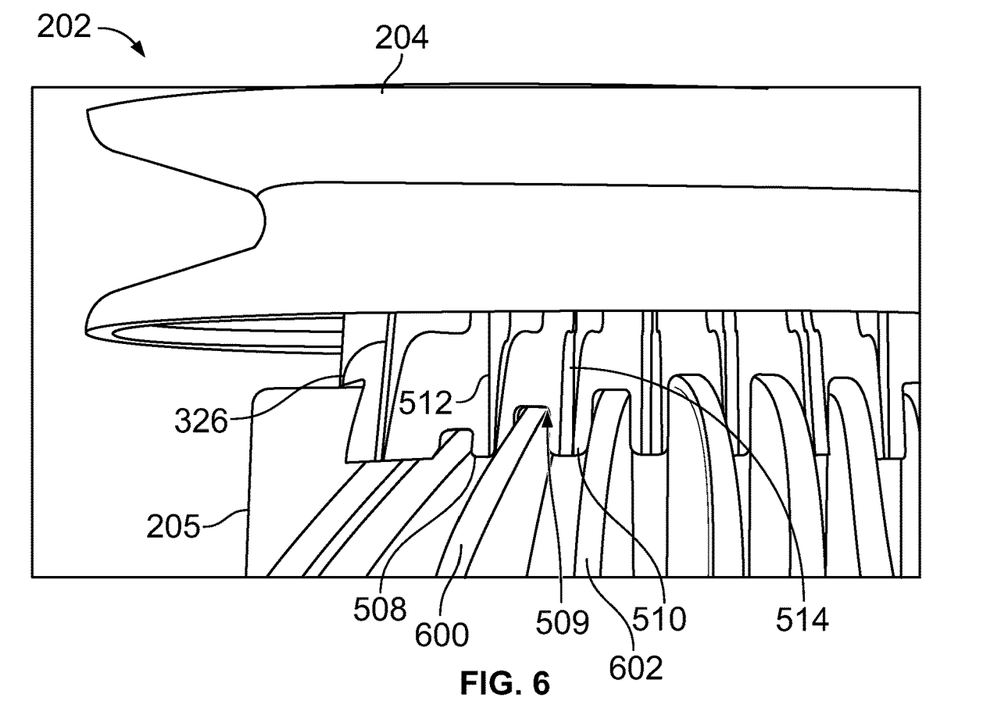
FIG. 6 illustrates a partial perspective view of the hydraulic pump of FIG. 3 showing a pulley and a housing, and a seal guard interposed therebetween, in accordance with an example implementation.

FIG. 6 illustrates a partial perspective view of the hydraulic pump 202 showing the pulley 204 and the housing 205, and the seal guard member 326 interposed therebetween, in accordance with an example implementation. As shown in FIG. 6, the housing 205 includes a plurality of fins, such as fin 600 and fin 602, about its exterior surface. These fins can be cooling fins that rely on conduction to diffuse the heat away from the housing 205. Particularly, the cooling fins are configured to increase the surface area of the housing 205 that is subjected to air, and thus heat from the hydraulic pump 202 is transferred to the air around the hydraulic pump 202 using convection, thereby cooling the fins, the fluid within the hydraulic pump 202, and the components of the hydraulic pump 202.

The seal guard member 326 is configured to be mounted to the housing 205 such that the fins of the housing 205 are interposed or received between respective tabs of the seal guard member 326. This way, as the input shaft 308 rotates, the fins preclude the seal guard member 326 from rotating therewith. For example, assuming that the input shaft 308 rotates counter-clockwise from a top view perspective of the hydraulic pump 202, the tab 508 of the seal guard member 326 interacts with the fin 600 of the housing 205, and the tab 510 of the seal guard member 326 interacts with the fin 602 of the housing 205 such that the seal guard member 326 stays stationary and is precluded from rotating with the input shaft 308.

In examples, to provide structural rigidity to the tabs, reinforcing tabs or stiffeners can be added to the tabs. For example, referring to FIGS. 5-6 together, the seal guard member 326 can include tab stiffener 512 that reinforces the tab 508, and include tab stiffener 514 that reinforces the tab 510.

The tabs and spaces therebetween represent an example anti-rotation feature. Other anti-rotation features can be used. For example, the seal guard member 326 can be attached to the housing 205 with one or more fasteners to prevent rotation. In another example, the seal guard member 326 can be affixed to the housing 205 with an adhesive to prevent rotation. In another example, the seal guard member 326 can be press-fit into the bore of the housing 205 with the seal 322 to prevent rotation.

In an example, the seal guard member 326 can be printed via a three-dimensional printing or other additive manufacturing techniques. In another example, the seal guard member 326 can be made of non-metallic material (e.g., Nylon plastic) and is molded to shape, to avoid additional machining once molded. In another example, the seal guard member 326 can be cast or machined from a variety of metallic alloys, aluminum, steel/iron, magnesium, etc. The part that we are proposing is a molded non-metallic (Nylon plastic) that will be molded to shape and not require additional machining.

Figure 7:
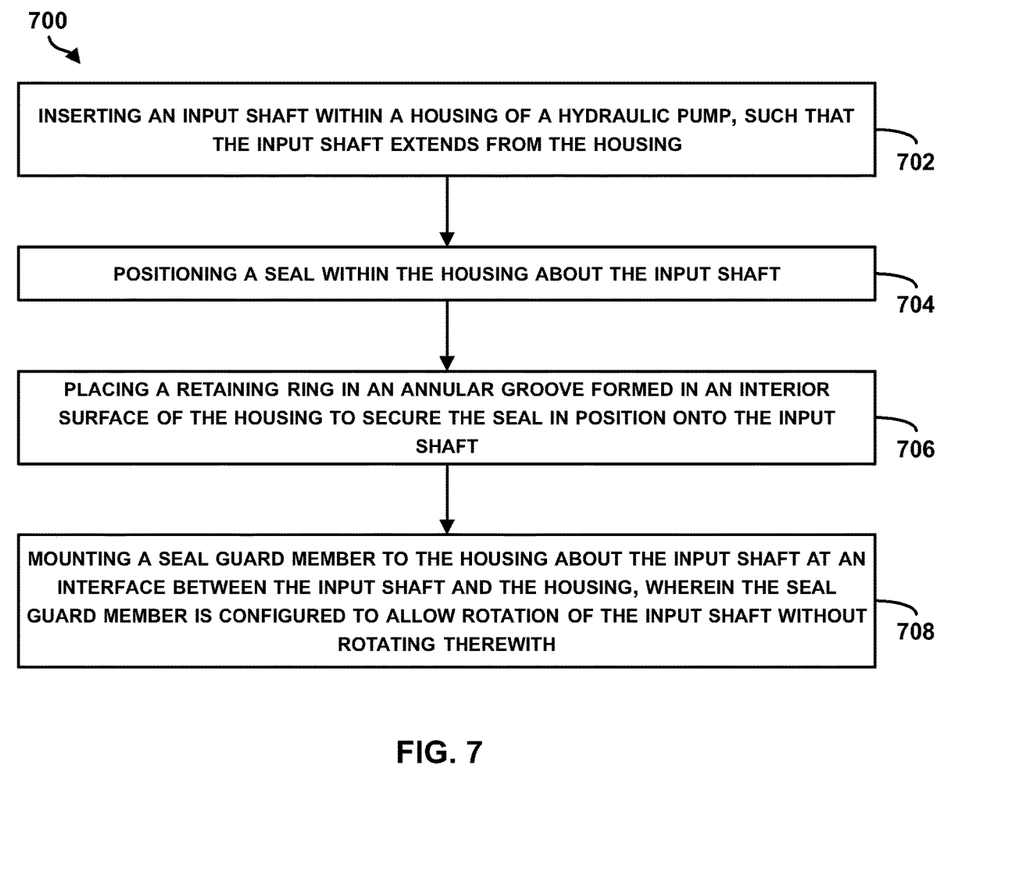
FIG. 7 is a flowchart of a method for assembling a hydraulic pump of a transmission, in accordance with an example implementation.

FIG. 7 is a flowchart of a method 700 for assembling a hydraulic pump, in accordance with an example implementation. For example, the method 700 can be used for assembling the hydraulic pump 202.

The method 700 may include one or more operations, or actions as illustrated by one or more of blocks 702-708, 800, and 900. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 702, the method 700 includes inserting the input shaft 308 within the housing 205 of the hydraulic pump 202, such that the input shaft 308 extends from the housing 205. The housing 205 of the hydraulic pump 202 is provided, e.g., made available for use, such as being supplied or brought to an apparatus or to a work environment for further processing including mounting the input shaft 308 within the housing 205.

At block 704, the method 700 includes positioning the seal 322 within the housing 205 about the input shaft 308 as shown in FIGS. 4A-4B.

At block 706, the method 700 includes placing the retaining ring 324 in an annular groove formed in an interior surface of the housing 205 (see FIGS. 4A-4B) to secure the seal 322 in position onto the input shaft 308.

At block 708, the method 700 includes mounting the seal guard member 326 to the housing 205 about the input shaft 308 at an interface between the input shaft 308 and the housing 205, wherein the seal guard member 326 is configured to allow rotation of the input shaft 308 without rotating therewith.

Figure 8:
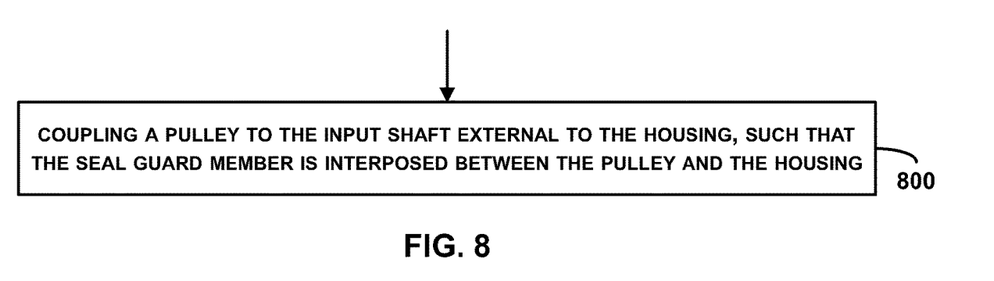
FIG. 8 is a flowchart of additional operations performed with the method of FIG. 7, in accordance with an example implementation.

FIG. 8 is a flowchart of additional operations performed with the method 700 of FIG. 7, in accordance with an example implementation. At block 800, operations include coupling the pulley 204 to the input shaft 308 external to the housing 205, such that the seal guard member 326 is interposed between the pulley 204 and the housing 205.

Figure 9:
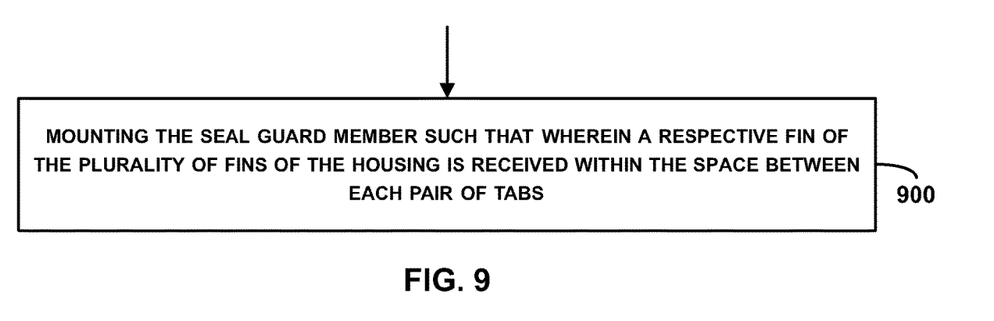
FIG. 9 is a flowchart of additional operations performed with the method of FIG. 7, in accordance with an example implementation.

FIG. 9 is a flowchart of additional operations performed with the method 700 of FIG. 7, in accordance with an example implementation. The housing can include a plurality of fins (cooling fins such as the fin 600 and the fin 602) disposed about an exterior surface of the housing 205, and the seal guard member 326 can include a plurality of tabs extending from a periphery of the seal guard member 326 (e.g., the tab 508 and the tab 510) such that a space (e.g., the space 509) is formed between each pair of tabs. At block 900, operations include mounting the seal guard member 326 such that wherein a respective fin of the plurality of fins of the housing 205 is received within the space between each pair of tabs of the seal guard member 326.

The method can include other steps described herein. For example, the method can further include mounting the fan 206 to the input shaft 308 and locking it in place using the nut 312 and the washer 314 as shown in FIGS. 3, 4A The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a hydraulic pump comprising: a housing; an input shaft extending from the housing; a seal disposed within the housing and positioned about the input shaft; and a seal guard member positioned about the input shaft and mounted to the housing at an interface between the input shaft and the housing, wherein the seal guard member is configured to allow rotation of the input shaft without rotating therewith.

EEE 2 is the hydraulic pump of EEE 1, further comprising: a pulley coupled to the input shaft and disposed external to the housing such that a gap is formed between the pulley and the housing, wherein the seal guard member is mounted in the gap, wherein the seal guard member is configured to allow rotation of the pulley without rotating therewith.

EEE 3 is the hydraulic pump of EEE 2, wherein the pulley comprises: a pulley hub that is rotatably-coupled to the input shaft, wherein the seal guard member is configured and shaped so as to fill the gap and conform to the pulley, the pulley hub, the input shaft, and the housing.

EEE 4 is the hydraulic pump of any of EEEs 1-3, wherein the seal guard member comprises a peripheral portion, a central hub portion, and a depression separating the central hub portion from the peripheral portion, wherein the central hub portion includes a hole through which the input shaft is disposed.

EEE 5 is the hydraulic pump of EEE 4, wherein the seal guard member further comprises a plurality of stiffening ribs disposed between the peripheral portion and the central hub portion, such that the plurality of stiffening ribs partitions the depression into respective compartments.

EEE 6 is the hydraulic pump of any of EEEs 1-5, wherein the seal guard member comprises an anti-rotation feature that precludes the seal guard member from rotating as the input shaft rotates.

EEE 7 is the hydraulic pump of EEE 6, wherein the housing comprises a plurality of fins disposed about an exterior surface of the housing, and wherein the anti-rotation feature of the seal guard member comprises: a plurality of tabs extending from a periphery of the seal guard member, such that a space is formed between each pair of tabs, wherein a respective fin of the plurality of fins of the housing is received within the space between each pair of tabs.

EEE 8 is the hydraulic pump of EEE 7, wherein the seal guard member further comprises: respective tab stiffeners that reinforce respective tabs of the plurality of tabs.

EEE 9 is the hydraulic pump of any of EEEs 1-8, further comprising: a retaining ring securing the seal to the housing.

EEE 10 is a hydrostatic transmission of a vehicle, the hydrostatic transmission comprising: a hydraulic motor configured to drive a wheel of the vehicle; and a hydraulic pump configured to provide fluid flow to drive the hydraulic motor, wherein the hydraulic pump comprises: a housing, an input shaft extending from the housing, a seal disposed within the housing and positioned about the input shaft, and a seal guard member positioned about the input shaft and mounted to the housing at an interface between the input shaft and the housing, wherein the seal guard member is configured to allow rotation of the input shaft without rotating therewith.

EEE 11 is the hydrostatic transmission of EEE 10, wherein the hydraulic pump further comprises: a pulley coupled to the input shaft and disposed external to the housing such that a gap is formed between the pulley and the housing, wherein the seal guard member is mounted in the gap, wherein the seal guard member is configured to allow rotation of the pulley without rotating therewith.

EEE 12 is the hydrostatic transmission of EEE 11, wherein the pulley comprises: a pulley hub that is rotatably-coupled to the input shaft, wherein the seal guard member is configured and shaped so as to fill the gap and conform to the pulley, the pulley hub, the input shaft, and the housing.

EEE 13 is the hydrostatic transmission of any of EEEs 10-12, wherein the seal guard member comprises a peripheral portion, a central hub portion, and a depression separating the central hub portion from the peripheral portion, wherein the central hub portion includes a hole through which the input shaft is disposed.

EEE 14 is the hydrostatic transmission of EEE 13, wherein the seal guard member further comprises a plurality of stiffening ribs disposed between the peripheral portion and the central hub portion, such that the plurality of stiffening ribs partitions the depression into respective compartments.

EEE 15 is the hydrostatic transmission of any of EEEs 10-14, wherein the seal guard member comprises an anti-rotation feature that precludes the seal guard member from rotating as the input shaft rotates.

EEE 16 is the hydrostatic transmission of EEE 15, wherein the housing comprises a plurality of fins disposed about an exterior surface of the housing, and wherein the anti-rotation feature of the seal guard member comprises: a plurality of tabs extending from a periphery of the seal guard member, such that a space is formed between each pair of tabs, wherein a respective fin of the plurality of fins of the housing is received within the space between each pair of tabs.

EEE 17 is the hydrostatic transmission of EEE 16, wherein the seal guard member further comprises: respective tab stiffeners that reinforce respective tabs of the plurality of tabs.

EEE 18 is a method comprising: inserting an input shaft within a housing of a hydraulic pump, such that the input shaft extends from the housing; positioning a seal within the housing about the input shaft; placing a retaining ring in an annular groove formed in an interior surface of the housing to secure the seal in position onto the input shaft; and mounting a seal guard member to the housing about the input shaft at an interface between the input shaft and the housing, wherein the seal guard member is configured to allow rotation of the input shaft without rotating therewith.

EEE 19 is the method of EEE 18, further comprising: coupling a pulley to the input shaft external to the housing, such that the seal guard member is interposed between the pulley and the housing.

EEE 20 is the method of any of EEEs 18-19, wherein the housing comprises a plurality of fins disposed about an exterior surface of the housing, and wherein the seal guard member comprises a plurality of tabs extending from a periphery of the seal guard member such that a space is formed between each pair of tabs, wherein mounting the seal guard member to the housing comprises: mounting the seal guard member such that wherein a respective fin of the plurality of fins of the housing is received within the space between each pair of tabs.

What is claimed is:

1. A hydraulic pump comprising:
a housing;
an input shaft extending from the housing;
a pulley disposed external to the housing such that a gap is formed between the pulley and the housing;
a seal disposed within the housing and positioned about the input shaft; and
a seal guard member positioned about the input shaft in the gap, wherein the seal guard member is configured and shaped to conform to a portion of the pulley, the input shaft, and the housing, and wherein the seal guard member is configured to allow rotation of the input shaft without rotating therewith.

2. The hydraulic pump of claim 1, wherein the pulley comprises a pulley hub that is rotatably-coupled to the input shaft, wherein the seal guard member is further configured to conform to the pulley hub.

3. The hydraulic pump of claim 1, wherein the seal guard member comprises a peripheral portion, a central hub portion, and a depression separating the central hub portion from the peripheral portion, wherein the central hub portion includes a hole through which the input shaft is disposed.

4. The hydraulic pump of claim 3, wherein the seal guard member further comprises a plurality of stiffening ribs disposed between the peripheral portion and the central hub portion, such that the plurality of stiffening ribs partitions the depression into respective compartments.

5. The hydraulic pump of claim 1, wherein the seal guard member comprises an anti-rotation feature that prevents the seal guard member from rotating as the input shaft rotates.

6. The hydraulic pump of claim 5, wherein the housing comprises a plurality of fins disposed about an exterior surface of the housing, and wherein the anti-rotation feature of the seal guard member comprises a plurality of tabs extending from a periphery of the seal guard member such that a space is formed between each pair of tabs, wherein a respective fin of the plurality of fins of the housing is received within the space between each pair of tabs.

7. The hydraulic pump of claim 6, wherein the seal guard member further comprises:
respective tab stiffeners that reinforce respective tabs of the plurality of tabs.

8. The hydraulic pump of claim 1, further comprising:
a retaining ring securing the seal to the housing.

9. A hydrostatic transmission of a vehicle, the hydrostatic transmission comprising:
a hydraulic motor configured to drive a wheel of the vehicle; and
a hydraulic pump configured to provide fluid flow to drive the hydraulic motor, wherein the hydraulic pump comprises:
a housing,
an input shaft extending from the housing,
a seal disposed within the housing and positioned about the input shaft, and
a seal guard member positioned about the input shaft and mounted to the housing at an interface between the input shaft and the housing, wherein the seal guard member is configured to allow rotation of the input shaft without rotating therewith, wherein the seal guard member comprises a peripheral portion, a central hub portion, and a depression separating the central hub portion from the peripheral portion, wherein the central hub portion includes a hole through which the input shaft is disposed.

10. The hydrostatic transmission of claim 9, wherein the hydraulic pump further comprises:
a pulley coupled to the input shaft and disposed external to the housing such that a gap is formed between the pulley and the housing, wherein the seal guard member is mounted in the gap, wherein the seal guard member is configured to allow rotation of the pulley without rotating therewith.

11. The hydrostatic transmission of claim 10, wherein the pulley comprises a pulley hub that is rotatably-coupled to the input shaft, wherein the seal guard member is configured and shaped so as to fill the gap and conform to a portion of the pulley, the input shaft, and the housing.

12. The hydrostatic transmission of claim 9, wherein the seal guard member further comprises a plurality of stiffening ribs disposed between the peripheral portion and the central hub portion, such that the plurality of stiffening ribs partitions the depression into respective compartments.

13. The hydrostatic transmission of claim 9, wherein the seal guard member comprises an anti-rotation feature that prevents the seal guard member from rotating as the input shaft rotates.

14. The hydrostatic transmission of claim 13, wherein the housing comprises a plurality of fins disposed about an exterior surface of the housing, and wherein the anti-rotation feature of the seal guard member comprises a plurality of tabs extending from a periphery of the seal guard member such that a space is formed between each pair of tabs, wherein a respective fin of the plurality of fins of the housing is received within the space between each pair of tabs.

15. The hydrostatic transmission of claim 14, wherein the seal guard member further comprises:
respective tab stiffeners that reinforce respective tabs of the plurality of tabs.

16. A method comprising:
inserting an input shaft within a housing of a hydraulic pump, such that the input shaft extends from the housing, wherein the housing comprises a plurality of fins disposed about an exterior surface of the housing;
positioning a seal within the housing about the input shaft;
placing a retaining ring in an annular groove formed in an interior surface of the housing to secure the seal in position onto the input shaft; and
mounting a seal guard member to the housing about the input shaft at an interface between the input shaft and the housing, wherein the seal guard member is configured to allow rotation of the input shaft without rotating therewith, wherein the seal guard member comprises a plurality of tabs extending from a periphery of the seal guard member such that a space is formed between each pair of tabs, wherein a respective fin of the plurality of fins of the housing is received within the space between each pair of tabs when the seal guard member is mounted to the housing.

17. The method of claim 16, further comprising:
coupling a pulley to the input shaft external to the housing, such that the seal guard member is interposed between the pulley and the housing.

* * * * *